United States Patent [19]

Makita

[11] Patent Number: 4,499,450
[45] Date of Patent: Feb. 12, 1985

[54] SYSTEM TO DETECT SLIPPAGE OF A CLUTCH FOR AN INTERNAL COMBUSTION ENGINE

[75] Inventor: Fujio Makita, Hachioji, Japan

[73] Assignee: Fuji Jukogyo Kabushiki Kaisha, Tokyo, Japan

[21] Appl. No.: 350,974

[22] Filed: Feb. 22, 1982

[30] Foreign Application Priority Data

Feb. 24, 1981 [JP] Japan .................................. 56-26482

[51] Int. Cl.³ .......................... G08B 21/00; B60Q 1/00
[52] U.S. Cl. .................................... 340/52 R; 340/53; 340/681
[58] Field of Search ......................... 340/681, 52 R, 53

[56] References Cited

U.S. PATENT DOCUMENTS 3,636,364  1/1972  Stempler et al. ..................... 340/681
3,803,574  4/1974  Logue ................................. 340/681
3,877,003  4/1975  Kawashima et al. ................ 340/681
4,263,578  4/1981  Fukuhara et al. ................... 340/681

Primary Examiner—Glen R. Swann, III
Attorney, Agent, or Firm—Martin A. Farber

[57] ABSTRACT

An electromagnetic clutch has a drive member secured to a crankshaft of an internal combustion engine, and a driven member adjacent to the drive member. The system comprises a circuit for detecting the difference between numbers of revolutions of the drive member and driven member, a comparator for producing an output when the difference is higher than a reference value, a timer operated by the output of the comparator, and a warning device such as a buzzer operated by the signal from the timer when a predetermined time elapses. Thus, when the clutch slips, the warning signal is generated. Further, a circuit for changing clutch engaging characteristics is provided to be operated by the output of the comparator for preventing the overheating of the clutch.

5 Claims, 4 Drawing Figures

SYSTEM TO DETECT SLIPPAGE OF A CLUTCH FOR AN INTERNAL COMBUSTION ENGINE

BACKGROUND OF THE INVENTION

The present invention relates to a system for detecting slippage of a clutch for an internal combustion engine and for preventing the breakdown of the clutch caused by the resulting overheating.

A clutch such as a friction clutch or an electromagnetic clutch provides slippage between a drive member and a driven member, when the speed of the crankshaft of the engine is different from the speed of a driven shaft. This slippage generates heat which elevates the temperature of the clutch. In normal clutch operation, the amount of heat generated is negligible, but if the slippage continues for a considerable time, overheating can occur which may cause clutch elements to become inoperative.

For example with respect to an electromagnetic clutch, the latter is arranged so that the clutch torque is controlled in dependency on the engine speed to allow smooth starting of the vehicle, even in starting on a steep uphill. Slippage in the clutch provides a clutch torque suitable for the starting. However, if such slippage continues too long, the clutch will be overheated causing deterioration of the clutch operation. In order to prevent this condition from occurring a sensor for detecting clutch temperature is provided in some conventional electromagnetic clutches. Such a detecting system is disclosed in Japanese patent application laid open No. 56-60733, nevertheless it is difficult to directly detect the temperature of a heat generating portion of a clutch, because such a portion is typically sealed in the clutch.

Consequently, heat detecting sensors are usually provided for detecting the temperature of a clutch outer member such as a housing. Using such a sensor, rapid elevation of the temperature caused by continuous slippage cannot be immediately detected, a breakdown of the clutch may result before the overheating condition is detected.

SUMMARY OF THE INVENTION

The object of the present invention is to provide a system which can detect slippage of a clutch from the difference between the speed of a drive member of the clutch and the speed of a driven member.

According to the present invention, there is provided a system for detecting slippage of a clutch for an internal combustion engine, which has a drive member secured to a crankshaft of the internal combustion engine, and a driven member adjacent to the drive member. The system includes first circuit means for producing an output signal in proportion to the number of revolutions of the drive member; second circuit means for producing an output signal in proportion to the number of revolutions of the driven member; third circuit means for producing the difference between output signals of the first and second circuit means; a comparator means for comparing the difference with a predetermined reference value and for producing an output signal when the difference is higher than the reference value; a timer operated by the output signal of the comparator; and a warning device connected to the timer. The timer is so arranged as to produce an output signal for operating the warning device when a predetermined time lapses.

The present invention will be more apparent from the following description made with reference to the accompanying drawings.

DETAILED DESCRIPTION OF THE PREFERRED EMBODIMENTS

Figure 1:
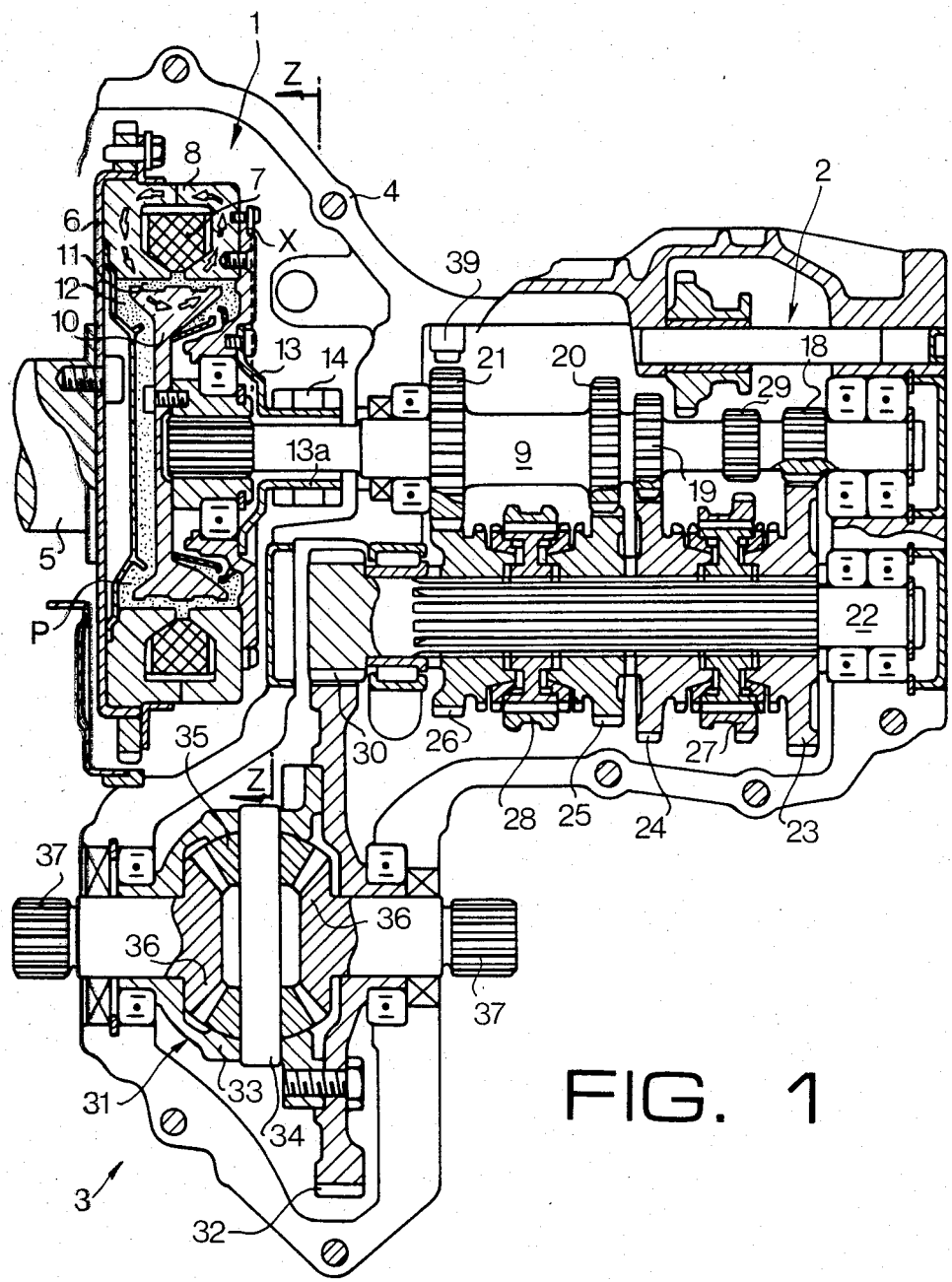
FIG. 1 is a sectional view of an electromagnetic clutch used in a system according to the present invention.
Figure 2:
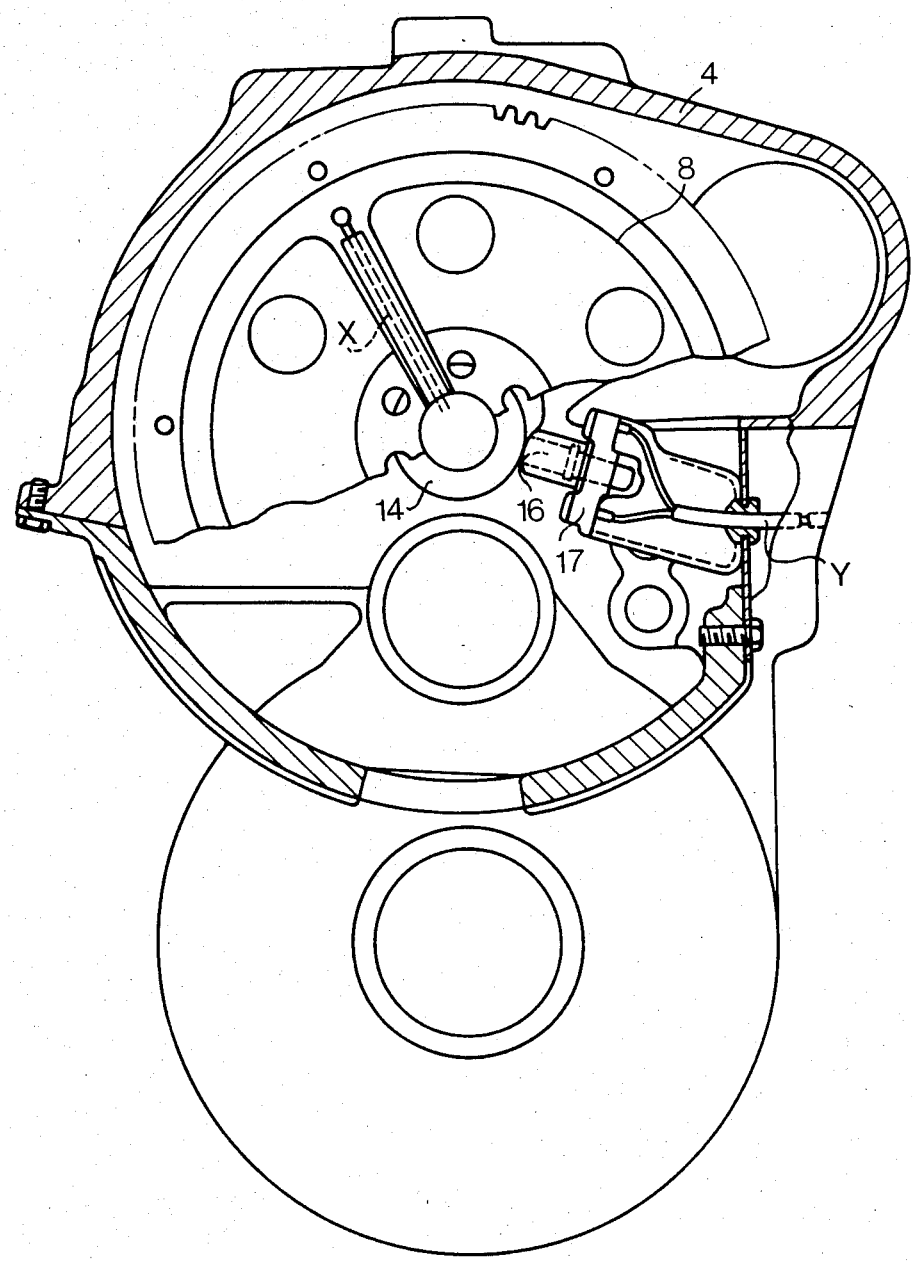
FIG. 2 is a sectional view taken along the line Z—Z in FIG. 1.

Referring to FIGS. 1 and 2 showing an electromagnetic powder clutch to which the present invention is applied, an electromagnetic powder clutch 1 is provided between an internal combustion engine (not shown) and a four-speed transmission 2 which is connected to a final reduction device 3.

The electromagnetic powder clutch 1 is provided in a clutch case 4. The electromagnetic powder clutch comprises a drive plate 6 connected to the end of a crankshaft 5 of the internal combustion engine, an annular drive member 8 secured to the drive plate 6, a magnetizing coil 7 provided in the drive member 8, and a driven member 10 secured by a spline engagement to an input shaft 9 of the transmission 2, leaving a gap 11 from the drive member 8. Magnetic powder P is provided in a powder chamber 12 and the gap 11 is adapted to be filled with the powder. A cap 13 is secured to the drive member 8. The cap 13 has a cylindrical portion 13a coaxial with the input shaft 9, on which slip rings 14 are securely provided. The slip rings 14 are connected to the coil 7 by leads X. Brushes 16 pressed against slip rings 14 are supported in a holder 17 and connected to a hereinafter described control means by leads Y (see FIG. 2).

In such a construction, the drive plate 6 and the drive member 8 rotate together with the crankshaft 5 and the magnetic powder sealed in the powder chamber 12 is drawn on the inner surface of the drive member 8 by centrifugal force. When the magnetizing coil 7 is excited by the current supplied through the leads Y, brushes 16, slip rings 14 and leads X, the drive member 8 is magnetized to produce a magnetic flux passing through the driven member 10 as shown by arrows in FIG. 1. Thus, the powder is aggregated in the gap 11, so that the output power of the crankshaft 5 is transmitted to the input shaft 9 through the clutch.

In the transmission 2, 1st to 4th speed drive gears 18 to 21 are integrally mounted on the input shaft 9. The drive gears 18 to 21 are respectively engaged with driven gears 23 to 26. The driven gears 23 to 26 are rotatably mounted on an output shaft 22 parallel to the input shaft 9. Each of the driven gears 23 and 24 is adapted to be engaged with the output shaft 22 by operating a synchromesh mechanism 27 and each of the driven gears 25 and 26 is adapted to be engaged with the output shaft 22 by a synchromesh mechanism 28 in the well-known manner. Further, a reverse drive gear 29 is mounted on the input shaft 9. Thus, by operating the shift lever (not shown) of the transmission, the driven gear 23 is coupled integrally with the output shaft 22 by the synchromesh mechanism 27 and the 1st speed is obtained on the output shaft 22. Similarly, the 2nd, 3rd and 4th speeds may be respectively obtained by operating the shift lever.

Moreover, provided on an end of the output shaft 22 is an output gear 30 which engages with a ring gear 32 in a differential 31 of the final reduction device 3. Thus, output of the output shaft 22 of the transmission 2 is transmitted to side gears 36 through a case 33, a spider 34 and pinions 35, and further to driving wheels through wheel shafts 37. In accordance with the present invention, a magnetically operated speed sensor 39 is secured on the inner wall of the clutch case 4 at a position adjacent to the drive gear 21. The speed sensor 39 is such that when the magnetic field is changed by a tooth of the gear 21, an output pulse is produced.

Figure 3:
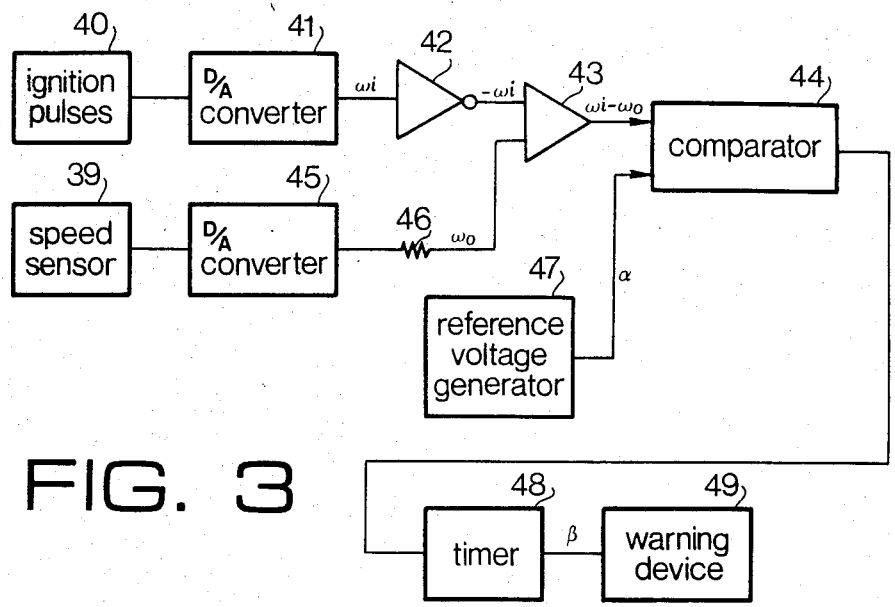
FIG. 3 is a block diagram showing a circuit for detecting slippage of the clutch.

Referring to FIG. 3 showing a system for detecting slippage of the clutch, ignition pulses of an ignition pulse sensor 40 for the engine are applied to a D/A (digital-analog) converter 41. The output of the D/A converter 41 is connected to an inverter 42. The output of the inverter 42 is connected to one of inputs of an adder 43. The output of the magnetically operated speed sensor 39 is connected to a D/A converter 45, the output of which in turn is connected to the other input of the adder 43 through a resistor 46. The output of the adder is connected to one of inputs of a comparator 44. The comparator 44 is applied with a reference voltage from a reference voltage generator 47 at the other input. The comparator is adapted to produce a high level output, when the output of the adder 43 is higher than the reference voltage from the reference voltage generator 47. The output of the comparator 44 is connected to a timer 48, the output of which is connected to a warning device 49 such as a buzzer, lamp, or the like.

As described above, the crankshaft 5 is operatively and magnetically connected to the input shaft 9 by exciting the coil 7, so that the output of the engine is transmitted to the transmission 2. The slipping of the clutch can be detected by the difference between the number of revolutions ($\omega i$) of the crankshaft 5 and the number of revolutions ($\omega o$) of the input shaft 9. The heat quantity generated in the clutch during the slipping is related with the difference of the number of revolutions ($\omega i - \omega o$) and the torque (Tc) of the clutch. Thus, the heat quantity can be given by integrating the product of the difference ($\omega i - \omega o$) and the torque (Tc) with the slipping time. However, when the clutch slips under a constant clutch current without the variation of the clutch torque, the heat quantity is in proportion to the product of the difference ($\omega i - \omega o$) and the slipping time (t). Therefore, the overheat of the clutch can be approximately detected by the continuation of a large difference ($\omega i - \omega o$) for a predetermined long time. The system of FIG. 3 detects slippage of the clutch with probable resulting overheating as described hereinafter.

Ignition pulses of the sensor 40 have repetition frequency which is in proportion to the engine speed, namely, the speed of the crankshaft 5. The D/A converter 41 converts the ignition pulses to direct current voltage signal $\omega i$ which is proportional to the engine speed. On the other hand, the speed sensor 39 produces pulses having repetition frequency in proportion to the speed of the input shaft 9. The pulses are converted by the D/A converter 45 to direct current which is passed through the resistor 46 to produce a signal $\omega o$. The circuit is so arranged that signals $\omega i$ and $\omega o$ are equal in voltage when speeds of the crankshaft 5 and input shaft are equal. The signal $\omega i$ is inverted to the signal $-\omega i$ by the inverter 42. Both signals $-\omega i$ and $\omega o$ are added by the adder 43 to produce the signal ($\omega i - \omega o$). The output ($\omega i - \omega o$) is applied to the comparator 44 for comparing with a reference voltage from the reference voltage generator 47. When the difference ($\omega i - \omega o$) is lower than the reference voltage $\alpha$, the comparator 44 produces a low level output. When the difference ($\omega i - \omega o$) is higher than the reference voltage $\alpha$, the output of the comparator 44 becomes high level. The high level output of the comparator 44 causes the timer 48 to start. When the high level output of the comparator 44 continues for a predetermined time $t_1$, the timer 48 sends a signal $\beta$ to the warning device 49 for signalling. Thus, the warning is given thereby to prevent the breakdown of the clutch.

Figure 4:
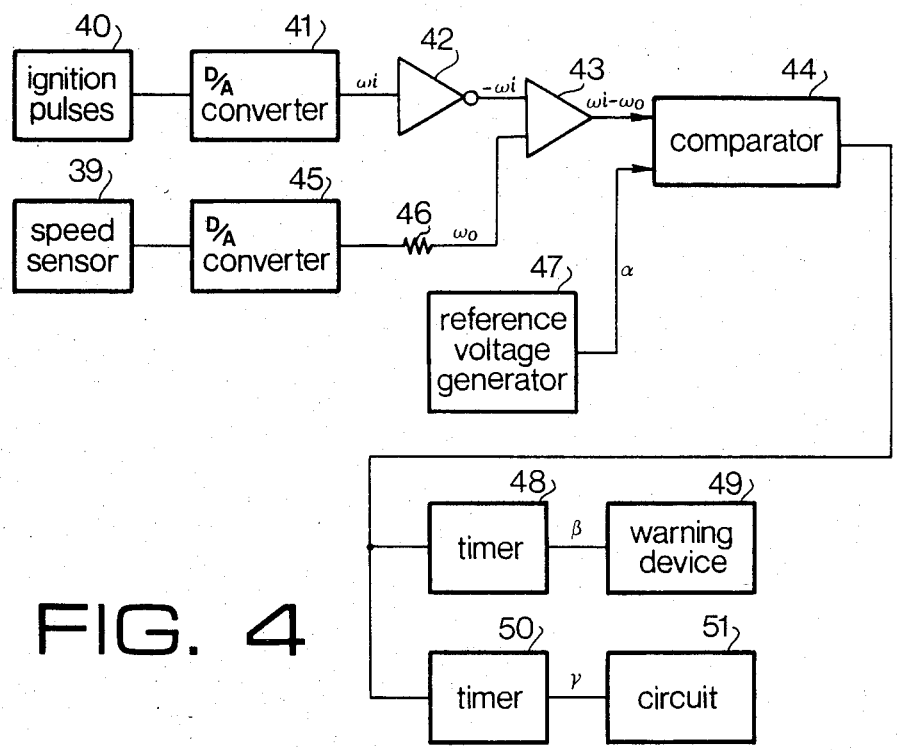
FIG. 4 is a block diagram showing another embodiment of the present invention.

Referring to FIG. 4, showing another embodiment of the present invention, the same part as the system of FIG. 3 is identified by the same reference numeral as FIG. 3 for the convenience of the explanation. The output of the comparator 44 is applied to the timer 48 and also to a timer 50. The timer 50 is connected to a circuit 51 for changing clutch engagement characteristics. Further, the timer 50 is set to have a counting time $t_2$ longer than a counting time $t_1$ of the timer 48.

The timer 50 starts at the same time as the timer 48. When the time $t_1$ elapses, the timer 48 produces a signal $\beta$ for operating the warning device 49 for signalling. If the clutch current continues to flow through the coil 7 in spite of the warning by the warning device 49 and the time $t_2$ lapses, the timer 50 produces a signal $\gamma$. The signal $\gamma$ operates the circuit 51 for changing the clutch engagement characteristics. For example, a high voltage is applied to the coil 7 or the clutch current is increased so as to entirely connect the clutch to stop the slipping and consequent heat buildup. As a result, the engine stalls by the complete engagement of the clutch, so that the overheating of the clutch may be prevented.

From the foregoing it will be understood that the present invention provides a system which detects slippage of a clutch from the difference between the rate of rotation of the drive member and the driven member of the clutch, so that the breakdown of the clutch caused by overheating is prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:
1. A system for detecting slippage of a clutch for an internal combustion engine which has a drive member secured to a crankshaft of said internal combustion engine and a driven member adjacent to said drive member, comprising:
   first circuit means for producing an output signal in proportion to the number of revolutions of said drive member;
   second circuit means for producing an output signal in proportion to the number of revolutions of said driven member;
   third circuit means for producing the difference between output signals of said first and second circuit means;

comparator means for comparing said difference with a predetermined reference value and for producing an output signal when said difference is higher than said reference value;

timer means operated in dependency on said output signal of said comparator; and a warning device connected to said timer means;

said timer means being so arranged as to produce an output signal for operating said warning device when a predetermined time elapses.

2. The system for detecting slippage of a clutch for an internal combustion engine in accordance with claim 1, further comprising fourth circuit means for changing clutch engaging characteristics of the drive member and the driven member, and a timer connected to said comparator means for operating said fourth circuit means.

3. The system according to claim 2, wherein the clutch is an electromagnetic powder clutch including:

a magnetizing coil in one of said members; and said one member defines a powder chamber enclosing the other of said members, said chamber being filled with magnetic powder; said driven member being separated from said drive member by a gap filled with said magnetic powder, wherein excitation of said coil magnetizes said one member causing said powder to aggregrate in the gap for transmitting power from said drive member to said driven member; and wherein said fourth circuit means comprises means responsive to said timer for engerizing said coil sufficiently to cause said drive member and said driven member to be fully engaged so as to eliminate slippage.

4. The system according to claim 2, wherein said timer operates said fourth circuit means after a predetermined time which is longer than that of said timer means.

5. A system for detecting slippage of a clutch for an internal combustion engine which has a drive member secured to a crankshaft of said internal combustion engine and a driven member adjacent to said drive member, comprising:

first circuit means for producing an output signal in proportion to the number of revolutions of said drive member;

second circuit means for producing an output signal in proportion to the number of revolutions of said driven member;

third circuit means for producing the difference between output signals of said first and second circuit means;

comparator means for comparing said difference with a predetermined reference value and for producing an output signal when said difference is higher than said reference value;

timer means responsive to said output signal of said comparator means for generating a timer output signal after a predetermined interval elapses during which said output signal of said comparator means continues.

* * * * *